United States Patent
Zheng

(10) Patent No.: US 11,459,470 B2
(45) Date of Patent: Oct. 4, 2022

(54) ANTISTATIC COATING COMPOSITIONS

(71) Applicant: ESSILOR INTERNATIONAL, Charenton le Pont (FR)

(72) Inventor: Haipeng Zheng, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 693 days.

(21) Appl. No.: 15/325,591

(22) PCT Filed: Jul. 11, 2014

(86) PCT No.: PCT/IB2014/001444
§ 371 (c)(1),
(2) Date: Jan. 11, 2017

(87) PCT Pub. No.: WO2016/005782
PCT Pub. Date: Jan. 14, 2016

(65) Prior Publication Data
US 2017/0158878 A1 Jun. 8, 2017

(51) Int. Cl.
*C08K 3/36* (2006.01)
*C09D 5/24* (2006.01)
*C09D 183/06* (2006.01)
*G02B 1/16* (2015.01)
*C09D 7/63* (2018.01)
*C09D 7/65* (2018.01)
*C08K 5/43* (2006.01)
*C09D 5/00* (2006.01)
*C08L 71/02* (2006.01)
*C08K 5/06* (2006.01)
*C08L 71/12* (2006.01)
*C08K 5/42* (2006.01)
*C08G 77/26* (2006.01)
*C08G 77/14* (2006.01)
*C09D 7/40* (2018.01)

(52) U.S. Cl.
CPC ............... *C09D 7/63* (2018.01); *C08K 3/36* (2013.01); *C08K 5/06* (2013.01); *C08K 5/43* (2013.01); *C08L 71/02* (2013.01); *C09D 5/00* (2013.01); *C09D 5/24* (2013.01); *C09D 7/65* (2018.01); *C09D 183/06* (2013.01); *G02B 1/16* (2015.01); *C08G 77/14* (2013.01); *C08G 77/26* (2013.01); *C08K 5/42* (2013.01); *C08L 71/126* (2013.01); *C09D 7/40* (2018.01)

(58) Field of Classification Search
CPC ....... C08G 77/00; C07C 31/202; C07C 31/00; G02B 1/16
See application file for complete search history.

(56) References Cited

U.S. PATENT DOCUMENTS

| | | | |
|---|---|---|---|
| 4,211,823 A | 7/1980 | Suzuki et al. | |
| 4,294,950 A | 10/1981 | Kato | |
| 5,015,523 A | 5/1991 | Kawashima et al. | |
| 5,171,479 A * | 12/1992 | Maki | C08L 101/00 252/511 |
| 6,624,237 B2 | 9/2003 | Biteau et al. | |
| 7,361,706 B2 * | 4/2008 | Thompson | D06M 15/277 524/462 |
| 10,100,239 B2 * | 10/2018 | Nakamura | C08G 63/91 |
| 2003/0165698 A1 | 9/2003 | Vaneeckhoutte et al. | |
| 2011/0248223 A1 | 10/2011 | Zheng | |
| 2012/0015179 A1 * | 1/2012 | Zheng | B29D 11/00865 428/336 |
| 2012/0038976 A1 * | 2/2012 | Kodaira | C09D 183/06 359/361 |
| 2012/0045577 A1 * | 2/2012 | Feret | C08G 65/336 427/162 |

FOREIGN PATENT DOCUMENTS

| | | | | |
|---|---|---|---|---|
| EP | 0614957 | 9/1994 | | |
| JP | S57195127 | 11/1982 | | |
| JP | 2008184556 | 8/2008 | | |
| JP | 5232945 B1 * | 7/2013 | | |
| WO | WO1994/010230 | 5/1994 | | |
| WO | WO-2008141981 A1 * | 11/2008 | | B82Y 30/00 |
| WO | WO2010/049503 | 5/2010 | | |
| WO | WO2010/076314 | 7/2010 | | |
| WO | WO2014/109770 | 7/2014 | | |

OTHER PUBLICATIONS

English Language Translation of JP5232549 (Year: 2013).*
Database WPI Week 198302, Thomson Scientific. London. GB; AN 1983-03594K, XP002735487.
Database WPI Week 200866, Thomson Scientific. London. GB; AN 2008-L26058, XP002735486.
International Search Report for PCT/IB2014/001444, dated Feb. 2, 2015.

* cited by examiner

*Primary Examiner* — Maria V Ewald
*Assistant Examiner* — Daniel P Dillon
(74) *Attorney, Agent, or Firm* — Norton Rose Fulbright US LLP

(57) ABSTRACT

Described is a curable composition that includes a salt comprising an alkali cation or rare earth metal ion and a counter ion which is the conjugate base of a superacid, a silicon containing binder, and an additive having a formula R1-O—[(CH$_2$—CHR3)-O]$_n$—R2, in which R1 and R2 represent H or an alkyl group, R3 is H or methyl, and n is an integer ranging from 2 to 200. Said composition is typically provided as a coating or hard coating. When cured, the composition provides good antistatic performance on its surface or to a surface on which it is applied. The composition when formed may also provide high optical transparency. The composition when formed exhibits low haze and good mechanical properties, such as good abrasion resistance, or good scratch resistance, or good mar resistance to its surface or to the surface on which it is applied.

20 Claims, No Drawings

ANTISTATIC COATING COMPOSITIONS

CROSS-REFERENCE TO RELATED APPLICATIONS

This application is a national phase application under 35 U.S.C. § 371 of International Application No. PCT/IB2014/001444 filed 11 Jul. 2014, the entire contents of which is specifically incorporated by reference herein without disclaimer.

BACKGROUND

Technical Field

What is described herein relates to curable compositions as antistatic coatings, including transparent hard coatings and articles thereof, and the preparation of said coatings.

Description of Related Art

Optical articles, as with many other articles, may be composed of one or more insulating materials. The insulating material can get charged with static electricity. Charges present at the surface of the article creates an electrostatic field capable of attracting and/or fixing lightweight objects moving near said charged surface, including small sized particles such as dust.

In order to decrease or suppress the static attraction of said particles, it is beneficial to decrease the intensity of the electrostatic field by decreasing the number of static charges that are present at the surface of the article. This may be carried out by introducing a layer or a material that induces a high mobility of the charges. Such a layer is an antistatic layer or an antistatic material.

The term antistatic generally includes a property of not retaining and/or developing an appreciable electrostatic charge. Many articles are considered to have an acceptable antistatic property when a surface that has been rubbed with an appropriate cloth does not attract or afix dust or small particles. An antistatic surface or material is generally capable of quickly dissipating accumulated electrostatic charges. The ability to evacuate a static charge can be quantified by measuring the time required for said charge to be dissipated (charge decay time). Generally, for an antistatic optical article a preferred discharge time of up to about 200 milliseconds is acceptable, while a static optical article will have a discharge time on the order of several tens of seconds, sometimes up to several minutes. Upon rubbing a static optical article, dust particles will be attracted to its surface for a length of time that is at least as long as is required for the surface to become discharged of the accumulated particles.

Numerous materials are known to confer antistatic properties, but few present a transparency required for optical applications, which includes a transmittance of visible light higher than 90%.

While transparent antistatic coatings may be obtained by vapor deposition of metals or metal-oxides, like indium tin oxide or vanadium oxide, such coatings are fragile and do not resist harsh mechanical conditions like bending or thermal stress.

The application of many antistatic coatings has been investigated. It has been found that coatings applied by wet route, i.e., by applying a flowable and curable composition, are difficult to obtain and/or are not sufficient in their antistatic performance. For example, conductive polymers, such as poly(3,4-ethylenedioxythiophene) may be grafted with a poly styrene sulfonate to improve its dispersion in water and further modified with various additives, including a sulfonate surfactant (as identified and described in US 2011/248223, hereby incorporated by reference in its entirety). However, formulations that include these high molecular weight polymers are difficult to obtain, due in part to aggregation, which has a negative effect on transparency.

Reducing electrical conductivity in aqueous based coating compositions has been attempted by includes specific additives that are very light charge holders, such as a positively charged lithium cations, or the addition of an ionic liquid (such as identified and described in JP2008/184556, herein incorporated by reference in its entirety) in the aqueous composition prior to curing. However, the addition of such specific additives into the aqueous based compositions provides detrimental changes to the abrasion properties of the compositions upon curing.

Thus, there remains a need to improve antistatic properties of coating compositions. There also remains a need to provide a transparent coating composition that also has high mechanical properties. And, there remains a need to provide a good antistatic coating composition for an article, such as an optical article, that also provides sufficient resistance to abrasions, scratches, and mars.

SUMMARY

In one or more embodiments described herein are antistatic compositions.

The antistatic compositions solve at least one or more obstacles described above.

The antistatic compositions satisfy one or more performance criteria including providing transparency, providing suitable mechanical performance, and providing suitable antistatic behavior and antistatic properties, such that said compositions as a coating or on a surface of an article thereof offer said improved performance antistatic characteristics to the coating surface of the composition or the surface of the article.

The antistatic compositions described herein may be used in one or more optical applications. With use of an antistatic composition in any of the one or more optical applications, said antistatic compositions satisfies one or more performance criteria including transparency and/or improved mechanical performance as described herein, with an appropriate antistatic behavior as described herein.

The antistatic coating composition described herein does not require a conductive polymer in its formulation.

The antistatic composition described herein generally includes at least: (a) a salt comprising an alkali cation or rare earth ion, and a counter ion which is the conjugate base of a superacid; (b) a binder; and (c) an additive compound having a formula identified below:

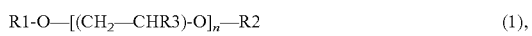
$$R1-O-[(CH_2-CHR3)-O]_n-R2 \quad (1),$$

wherein R1 represents H or an alkyl group, R2 represents H or an alkyl group, and R3 is H or methyl, and n is an integer ranging from 2 to 200. Additional components may also be included in said antistatic composition as are further described below. The compound of formula (1) may be compound of an ethylene glycol. The compound of formula (1) may be in an amount ranging from about 0.5 to about 20% by weight based on the total weight of the composition. The compound of formula (1) may have a molecular weight of up to about 1000 g/mol, or lower than about 1000 g/mol.

The at least one binder is a compound, wherein generally at least one of said binders will having a formula identified below:

$$R_{n'}Y_mSi(X)_{4-n'-m} \quad (2),$$

or a hydrolysate thereof, in which the R groups (functional groups) are identical or different and represent monovalent organic groups linked to the silicon atom through a carbon atom, the Y groups are identical or different and represent monovalent organic groups linked to the silicon atom through a carbon atom and containing at least one epoxy function, the X groups are identical or different and represent hydrolysable groups or hydrogen atoms, and m and n' are integers such that m is equal to 1 or 2 and n'+m=1 or 2.

The binder of formula (2) is formed from a reaction of hydrolysis and condensation and includes derivatives thereof. The binder of formula (2) may comprise an epoxysilane compound. The binder of formula (2) may be in an amount ranging from about 40% to about 70% by weight based on the total weight of the composition. The binder further comprises at least one filler. The at least one filler may comprise mineral oxide nanoparticles.

The salt may comprise a lithium cation. The salt may be in an amount about or less than about 5% by weight relative to the dry weight of the composition.

The composition may further comprise a solvent. Additionally, the composition may comprise a catalyst or cross-linking agent that reacts with a functional group, including an epoxy group, of the binder of formula (2). When formed, the composition may be transparent. When formed, the composition may have a transmittance of visible light at least as high as or higher than 90%.

Also described herein is an antistatic article comprising a transparent substrate, wherein the substrate has at least one exposed surface, and further comprising an antistatic coating composition, wherein the antistatic coating composition is a hard coat formed on at least a portion of the exposed surface of the transparent substrate from a curable composition. The antistatic coating composition is applied onto at least one exposed surface of the transparent substrate. The antistatic coating composition is cured after it is applied. The antistatic coating composition is formed from a composition having at least: (a) a salt comprising an alkali cation or rare earth ion, and a counter ion which is the conjugate base of a superacid; (b) a binder; and (c) an additive compound of formula (1). The antistatic coating composition may exhibit a decay time on its surface that is less than 400 milliseconds, a light transmittance of at least or greater than 90%, and a haze value of about or less than about 0.50%. The antistatic article may have a final thickness in a range from about 5 to about 5000 nm, preferably from about 1000 to about 4000 nm. When formed, the antistatic article may be transparent. The decay time of a transparent article may be about or less than about 250 milliseconds.

The antistatic coating composition described herein is formed from a formulation comprising at least a salt, wherein the salt comprises an alkali cation or rare earth metal ion and a counter ion which is the conjugate base of a superacid, and further comprising a compound depicted as formula (1)

$$R1-O-[(CH_2-CHR3)-O]_n-R2 \quad (1),$$

wherein R1 and R2 represent H, or an alkyl group, R3 is H or methyl, and n is an integer ranging from 2 to 200, and further comprising a binder, wherein the binder has a formula depicted as formula (2)

$$R_n Y_m Si(X)_{4-n'-m} \quad (2),$$

or is a hydrolysate thereof, in which the R groups are identical or different and represent monovalent organic groups linked to the silicon atom through a carbon atom, the Y groups are identical or different and represent monovalent organic groups linked to the silicon atom through a carbon atom and contain at least one epoxy function, the X groups are identical or different and represent hydrolysable groups or hydrogen atoms, and m and n' are integers such that m is equal to 1 or 2 and n'+m=1 or 2, and may further comprise a solvent. The antistatic article may further represent an ophthalmic lens Further described herein is a process for preparing an antistatic article, the process comprising providing a transparent substrate, wherein the transparent substrate has at least one exposed surface, applying onto at least one exposed surface of the transparent substrate an antistatic coating composition having a composition of any one of claims 1 to 16, and curing the antistatic coating composition after applying the antistatic coating composition.

DESCRIPTION

In the description which follows, although making and using various embodiments are discussed in detail below, it should be appreciated that as described herein are provided many inventive concepts that may be embodied in a wide variety of contexts. Embodiments discussed herein are merely representative and do not limit the scope of the invention.

Generally as described are curable compositions for preparing antistatic coatings, including transparent hard coatings, as well as articles and uses thereof. Said coating compositions may exhibit good antistatic properties, good abrasion resistant properties, good mar resistant properties and/or good scratch resistant properties. Articles produced by or including said coating compositions may include articles for optical and ophthalmic use, such as lenses for eyeglasses, or for other suitable articles on which an antistatic coating is desired. Processes for preparing said coating compositions and articles thereof are also described, which include the use of one or more additives in combination with a salt system in a coating composition formulation to increase antistatic properties of the composition when formed without lowering or detrimentally affecting other properties, such as abrasion resistance, scratch resistance, and/or mar resistance of the formed coating. Said coating compositions may or may not be transparent.

A coating composition described is a curable composition that includes in its coating formulation at least one of each of the following: (a) a salt system comprising an alkali cation or rare earth ion and a counter ion which is the conjugate base of a superacid; (b) a binder; and (c) an additive compound. Generally, the formulation comprises a plurality of additives that, in addition to a specific additive compound described herein, include a catalyst, a filler, and a wetting agent. The antistatic coatings composition described herein does not require the addition of a conductive polymer.

For the salt system, the alkali cation in the system is selected from an alkali metal cation, the alkali metal having a lower density than other metals and a loosely bound valence electron in its outer shell. The alkali metal includes lithium (Li), sodium (Na), potassium (K), rubidium (Rb), cesium (Cs), and francium (Fr), which are Group IA elements of the periodic table. In one or more embodiments, the alkali metal is Li, Na, or Cs, and the alkali metal cation is positively charged $Li^+$, $Na^+$ or $Cs^+$, respectively. As electrical conductivity is linked to the mobility of charged species in the bulk material, small alkali cations, or paramagnetic metal ions may yield better results. The rare earth ion may be selected from a rare earth metal (i.e., lanthanides), or scandium (Sc), or yttrium (Y), generally considered soft metals with 4f orbitals that are being filled, are paramagnetic, and form trivalent cations ($M^{3+}$). The lanthanides include lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). Zinc (Zn), a transition metal, may also serve as a possible source for the metal cation, in which the metal cation is, e.g., $Zn^+$. In one or more embodiments, the metal is La, Sm Sc, Y, or Er, and the metal ion is positively charged $La^{3+}$, $Sm^{3+}$, $Sc^{3+}$, $Y^{3+}$, or $Er^{3+}$, respectively.

The counter ion is a conjugate base of a superacid. A superacid is any acid that is stronger than 100% sulfuric acid and can include a Brønsted acid, Lewis acid, Brønsted-Lewis acid, and a solid acid. In one or more embodiments the superacid is a strong Brønsted acid. In some embodiments, the superacid is formed from an acid having a formula ZH, which donates a hydrogen cation, $H^+$, to become a conjugate base of the acid carrying a negative charge, $Z^-$. Said superacid may originate in the form of an acid ZH or in the form of a salt $M^+Z^-$ where $M^+$ is a counter ion. The superacid will undergo complete or nearly complete dissociation (deprotonation). Examples of superacids include but are not limited to $HBF_4$ (tetrafluoroboric acid), $HClO_4$ (perchloric acid), $HSbF_6$ (fluoroantimonic acid), $CF_3CO_2H$ (trifluoroacetic acid), $CF_3SO_3H$ (trifluoromethanesulfonic acid, $H_2SiF_6$ (hexafluorosilicic acid or triflic acid), and $HSO_3F$ (fluorosulfuric acid). Anions or counterions of said representative acids would be: $BF_4^-$, $ClO_4^-$, $SbF_6^-$, $CF_3CO_2^-$, $CF_3SO_3^-$, $SiF_6^{2-}$, and $HSO_3F^-$, respectively.

In one or more embodiments, the superacid is a fluorinated superacid in which the anion has a fluoride ion ligand. Fluorinated superacids provide a very strong electro-negativity from the fluorine. In one or more embodiments the superacid is one capable of providing a very strong electronegativity when deprotonated. Fluorosulfonic acid ($FSO_3H$) and trifluoromethanesulfonic acid ($CF_3SO_3H$) and their many derivatives are good examples of superacids providing very strong electronegativity when deprotonated. Said conjugate bases as counter ions are formed therefrom. Examples include fluorosulfonate, bis(trifluoromethane sulfonimide), trifluoromethanesulfonic acid, and their derivatives.

Said conjugate base of the superacid can thus be combined with a metal ion (e.g., an alkali metal cation or a rare earth ion), as represented in formula (3):

$$[\text{Metal}]^+[\text{Superacid}]^- \qquad (3).$$

Suitable examples of a suitable salt system for the described composition include but are not to limited to lithium bis(trifluoromethanesulfonimide) salt, lithium trifluoromethanesulfonic salt, lanthanum trifluoromethane sulfonic salt, samarium (III) trifluoromethane sulfonic salt, scandium trifluoromethane sulfonic salt, zinc trifluoromethane sulfonic salt, and erbium (III) trifluoromethane sulfonic salt.

In one or more embodiments, the salt is in an amount that is less than about 5% by weight, relative to the dry weight of the curable composition. In some embodiments, the salt is in an amount that is less than about 3% in weight of the dry weight of the curable composition.

In some embodiments, said salt system is soluble in the binder.

The binder is generally organic, a polymer or oligomer. It may be formed from a thermoplastic or thermosetting material, and may be cross-linkable through polycondensation, polyaddition and/or hydrolysis. Mixtures of binders from different categories may also be employed. The binder, when selected for optical purposes, has to form a stable solution without precipitation or aggregation therein of any of the other ingredients introduced therein, which would otherwise lead to one or more optical flaws.

In some embodiments, the binder may be referred to as a film-forming material as it assists in formation of the coating composition as a film. Said binder assists in improving adhesion of the coating composition when formed and when desired to adhere to an underlying layer and/or to an upper layer. Said binder also assists in the overall integrity of the coating composition when formed. The binder may and when desired will allow strengthening of the material when cured, resulting in abrasion resistance and/or scratch resistance of the final article.

In one or more embodiments, the binder may be selected in view of a solvent or solvent system used in the coating composition formulation, because said binder will have to be soluble or dispersible in said selected solvent or solvent system. Suitable solvents are generally polar solvents. In such embodiments, the composition further comprises a solvent.

The solvent is chosen to adjust viscosity of the composition formulation and provides good dispersion of the components described. A preferred solvent is water or an oxygenated solvent, an alcohol, ketone, ether, or mixtures thereof. Representative solvents include but are not limited to methanol, butanol, acetone, diacetone, methylethylketone, and a low boiling point glycol ether (i.e., one with a boiling point less than 150° C.). For example, when the solvent boiling point is too high, e.g., greater than 150° C., the composition, when cured exhibits decreased performance due the presence of some remaining solvent in the cured composition. Often, the solvent comprises a mixture of water and a water-miscible alcohol, such as but not limited to methanol, ethanol, n-propanol, isopropanol, n-butanol, isobutanol, sec-butanol, tert-butanol, n-amylic alcohol, isoamylic alcohol, sec-amylic alcohol, tert-amylic alcohol, 1-ethyl-1-propanol, 2-methyl-1-butanol, 1-methoxy-2-propanol n-hexanol, cyclohexanol, ethyl cellosolve (monoethoxy ethylene glycol), or ethylene glycol. In some embodiments, a solvent may include one identified as a polyoxyalkylene composition or one identified as Dowanol® (registered to Dow Chemical Company, Delaware, USA; i.e., fast-evaporating hydrophilic glycol ethers). In some embodiments, the solvent is methylethylketone.

The binder is water soluble or is dispersible in water or in an aqueous composition, such as a hydro-alcoholic composition. In many embodiments, only environmentally benign solvents (hydro-alcoholic compositions) are selected. These include water alone or in combination with a mild alcohol, such as $C_1$-$C_8$ alcohols, or $C_1$-$C_6$ alcohols, or $C_1$-$C_5$ alcohols or $C_1$-$C_4$ alcohols.

In one or more embodiments, the binder is formed generally via a reaction of hydrolysis and condensation of one or more silane derivatives.

In several preferable embodiments, the binder includes silicon. For example, the binder may be a functionalized silane, siloxane or silicate (alkali metal salt of a Si—OH compound), or hydrolysates thereof. These are generally substituted with one or more functional organic groups and form silica organosols. They also appear to act as adhesion promoters toward an organic or mineral glass substrate and/or may act as a cross-linking agent. An organofunctional binder, after having been subjected to hydrolysis, generates interpenetrated networks by forming silanol groups, which are capable of establishing bonds with an upper layer and/or an underlying layer when formed on said upper and/or lower layer.

In one or more forms, an above described binder is in the form of a silica organosol. In one or more forms, a silane containing binder is suspended rather than dissolved in an organic fluid. The dispersion eliminates the need for expensive solvents. A representative example of silica organosol or a "sol gel" coating formulation and its constituents may be found in U.S. Publication No. 2003/165698, which is hereby incorporated by reference in its entirety.

The described silicon containing binder may be in the form of a silane or siloxane bearing an amine group, such as but not limited to an amino alkoxysilane, hydroxy silane, alkoxysilane, methoxy or ethoxy silane (e.g., epoxy alkoxysilane), ureidoalkyl alkoxysilane, dialkyl dialkoxysilane (e.g., dimethyl diethoxysilane), vinylsilane, allylsilane, (meth)acrylic silane, carboxylic silane, polyvinylic alcohols bearing silane group, and mixtures thereof. Thus, the silicon containing binder may comprise an alkoxysilane, which also provides reactive groups for the silicon compound, and assists in formation of a cross-linked network and of sol-gel formation. Additional examples include a trialkoxysilane or tetraalkoxysilane or mixtures thereof, such as but not limited to tetraethyloxysilane (TEOS), tetramethyloxysilane (TMOS), dimethyldiethoxysilane (DMDES). Mixtures of said alkoxysilanes, including trialkoxysilanes or tetraalkoxysilanes are also suitable.

In some embodiments, a binder comprises at least one compound of formula (2):

$$R_{n'}Y_{m}Si(X)_{4-n'-m} \quad (2),$$

or a hydrolysate thereof, in which there are one or more R groups, Y groups and/or X groups, each R group being identical or different and represented as a monovalent organic group linked to the silicon atom through a carbon atom, each Y group being identical or different and represented as a monovalent organic group linked to the silicon atom through a carbon atom and containing at least one epoxy function, each X group being identical or different and represented as a hydrolysable group or hydrogen atom, and wherein m and n' are integers such that m is equal to 1 or 2, and n'+m=1 or 2.

The X groups may independently and without limitation be any of H, an alkoxy group $—OR^1$, wherein $R^1$ may represent a linear or branched alkyl or alkoxyalkyl group or a $C_1$-$C_4$ alkyl group, an acyloxy group $—O—C(O)R^3$, wherein $R^3$ may represent an alkyl group, a $C_1$-$C_6$ alkyl group or a methyl or ethyl group, a halogen group, such as Cl and Br, an amino group optionally substituted with one or two functional groups, such as an alkyl or silane group, for example an $NHSiMe_3$ group, an alkylenoxy group, such as an isopropenoxy group, and/or an trialkylsiloxy group, for example a trimethylsiloxy group.

The X group is sometimes an alkoxy group, such as a methoxy, ethoxy, propoxy or butoxy, and, in some embodiments, may be methoxy or ethoxy.

In formula (2), integers n' and m define three groups of compounds: compounds of formula $RYSi(X)_2$, compounds of formula $Y_2Si(X)_2$, and compounds of formula $YSi(X)_3$. In some embodiments, a binder is an epoxysilane having the formula $YSi(X)_3$. When a binder of formula (2) is an epoxysilane compound, it provides a highly cross-linked matrix when included in a composition described herein.

Some epoxysilanes have an organic link between the Si atom and the epoxy function that provides a degree of flexibility to the composition.

In many embodiments, a compound of formula (2) is an alkoxysilane.

The one or more R groups linked to the silicon atom through a Si—C bond are monovalent organic groups. These groups may be, without limitation, a hydrocarbon group, either saturated or unsaturated and from $C_1$-$C_{10}$ or from $C_1$-$C_4$, such as for example an alkyl group (e.g., $C_1$-$C_4$ alkyl group, such as methyl or ethyl group). In some embodiments, R groups are alkyl groups, including but not limited to $C_1$-$C_4$ alkyl groups, or methyl groups. The R group may also be an aminoalkyl group, an alkenyl group, such as a vinyl group, a $C_6$-$C_{10}$ aryl group, for example an optionally substituted phenyl group or a phenyl group substituted with one or more $C_1$-$C_4$ alkyl groups, a benzyl group, a (meth) acryloxyalkyl group, and/or a fluorinated or perfluorinated group corresponding to the above cited hydrocarbon groups, for example a fluoroalkyl or perfluoroalkyl group, or a (poly)fluoro or perfluoro alkoxy[(poly)alkyloxy]alkyl group.

The one or more Y groups linked to the silicon atom through a Si—C bond are monovalent organic groups that contain at least one epoxy function or epoxy group. In some embodiments, the Y group contains simply one epoxy function. Epoxy function means having a group of atoms, in which an oxygen atom is directly linked by single bonds to two adjacent carbon atoms or non adjacent carbon atoms comprised in a carbon containing chain or a cyclic carbon containing system. A representative epoxy function is an oxirane function, which is a three-membered cyclic ether.

Representative Y groups are provided below as formulas (4) and (5):

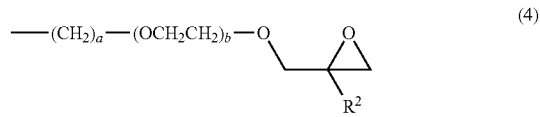

(4)

(5)

in which $R^2$ is an alkyl group or a methyl group or a hydrogen atom, and a and c are integers ranging from 1 to 6, while b is 0, 1 or 2. The Y group may be a γ-glycidoxypropyl group [$R^2$=H, a=3, b=0; e.g., formula (4))] or (3,4-epoxycyclohexyl)alkyl groups [e.g., formula (5)], such as β-(3,4-epoxycyclohexyl)ethyl groups (c=1). The Y group may also be a γ-glycidoxyethoxypropyl group ($R^2$=H, a=3, b=1).

In some embodiments, the compound of formula (2) is an epoxyalkoxysysilane. In one or more embodiments, the epoxyalkoxysysilane has one Y group and three alkoxy X groups. Some examples are shown as formulas (6) and (7) below:

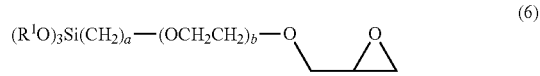

(6)

-continued

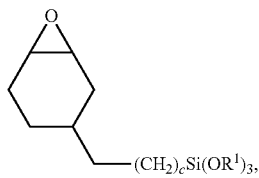

(7)

in which R¹ is an alkyl group having 1 to 6 carbon atoms or a methyl or an ethyl group, and a, b and c are as defined above.

Representative examples of suitable epoxysilane binders include but are not limited to an ethyl trimethoxysilane, a methyl trimethoxysilane, glycidoxy methyl trimethoxysilane, glycidoxy methyl triethoxysilane, glycidoxy methyl tripropoxysilane, α-glycidoxy ethyl trimethoxysilane, α-glycidoxy ethyl triethoxysilane, β-glycidoxy ethyl trimethoxysilane, β-glycidoxy ethyl triethoxysilane, β-glycidoxy ethyl tripropoxysilane, α-glycidoxy propyl trimethoxysilane, α-glycidoxy propyl triethoxysilane, α-glycidoxy propyl tripropoxysilane, β-glycidoxy propyl trimethoxysilane, β-glycidoxy propyl triethoxysilane, β-glycidoxy propyl tripropoxysilane, γ-glycidoxy propyl trimethoxysilane, γ-glycidoxy propyl triethoxysilane, γ-glycidoxy propyl tripropoxysilane, 2-(3,4-epoxycyclohexyl) ethyltrimethoxysilane, 2-(3,4-epoxycyclohexyl) ethyltriethoxysilane. Other examples include epoxytrialkoxysilanes as described in U.S. Pat. Nos. 4,294,950, 4,211,823, 5,015,523, EP No. 0614957, and International Application No. WO 94/10230, all of which are hereby incorporated by reference in their entirety. In some embodiments an epoxysilane binder is γ-glycidoxypropyltrimethoxysilane (GLYMO).

Representative examples of suitable epoxysilanes binders having one Y group and two X groups include but are not limited to, epoxydialkoxysilanes such as γ-glycidoxypropyl-methyl-dimethoxysilane, γ-glycidoxypropyl bis(trimethylsiloxy) methylsilane, γ-glycidoxypropyl-methyl-diethoxysilane, γ-glycidoxypropyl-methyl-diisopropenoxysilane, and γ-glycidoxyethoxypropyl-methyl-dimethoxysilane. When an epoxy dialkoxysilane is used, it may be combined with an epoxytrialkoxysilane, such as any of the type described above, and preferably employed in a lower amount than said epoxytrialkoxysilane.

A silane containing binder of formula (2), including those containing at least one epoxy group, when present, may be hydrolyzed partially or totally in the curable composition formulation described herein. In some embodiments, the silane containing binder has been completely hydrolyzed. The silane binder hydrolysates may be prepared in a known manner, e.g. such as disclosed in FR 2702486 and/or U.S. Pat. No. 4,211,823, both of which are hereby incorporated by reference in their entirety. In some embodiments, it may be preferable to use a stoichiometric amount of water for the hydrolysis, i.e. a molar quantity of water which corresponds to the number of moles of the groups which can produce silanols. Catalysts for said hydrolysis (e.g., hydrochloric acid or acetic acid), may be used to promote the hydrolysis reaction over the condensation reaction. By a treatment in an acidic solution, such as in hydrochloric acid or acetic acid solution, as examples, silanes are hydrolysed and form silanol groups which, when in the composition formulation undergo condensation upon curing and generate interpenetrated networks, which are capable of establishing bonds with an underlying layer.

The binder may be a cross-linkable curable binder owing to the presence of at least one cross-linking agent. Said cross-linking agent is preferably soluble or dispersible in water, and may include a known cross-linking agent that reacts with a functional group on the binder, such as a carboxyl group, a hydroxyl group, an epoxy group. A suitable cross-linking agent may be chosen from but is not limited to an anhydride, phenol, resole, amine, polysulphide, polyfunctional aziridine, amine-formaldehyde resins, methoxyalkylated melamine, methoxyalkylated melamine/formaldehyde, bisphenol A, carbodiimide, polyisocyanate, triazin and blocked polyisocyanates. In some embodiments a cross-linking agent is an aziridine. In some embodiments, a suitable crosslinking agent is a trifunctional aziridine.

The described binder may include a combination of said described binders, such as but not limited to a dialkoxysilane and a trialkoxysilane. For hardness, a tetraalkoxysilane may be used to make a harder composition when formed. Further the water soluble or water dispersible described binder, or described binder mixture, may also include a homopolymer or copolymer of one or more of the following monomers: styrene, vinylidene chloride, vinyl chloride, alkyl acrylate, alkyl methacrylate, (meth)acrylamide, polyester, poly(urethane-acrylate), poly(ester-urethane), polyether, vinyl polyacetate, polyepoxyde, polybutadiene, polyacrylonitrile, polyamide, melamine, polyurethane, polyvinylic alcohol, various copolymer thereof, and mixtures thereof.

In total, the amount of binder is generally in an amount ranging from about 40% to about 70% by weight based on the total weight of the coating composition formulation (solution). Generally, the total solids content of the binder is less than 65% based on the dry weight of the composition. In some embodiments, the binder is in an amount that the ratio of total weight of solid binder components (dry extract weight of binder)/total weight of the composition are in a range from about 1% to about 65%, or from about 5% to about 55%, or from about 10% to about 50%. The binder of formula (2) may include a first binder alone. The binder of formula (2) may include a first binder and a second binder. The binder of formula (2) may include more than one binder of formula (2).

In addition to the described salt system and the described binder, at least one additive of formula (1), as depicted below, is included in any of the described coating formulations. Said additive compound of formula (1) assists, in part, in the improved antistatic properties and performances of the coating composition or film produced therefrom. The additive compound of formula (1) is represented as:

wherein R1 represents H or an alkyl group, R2 represents H or an alkyl group, R3 is H or methyl, and n is an integer ranging from 2 to 200. R1 and R2 may be the same or may differ. For example, R1 may be a methyl group and R2 may be H. In another example, R1 may be a methyl group and R2 may be a methyl group. In a further example, R1 may be a methyl group and R2 may be $CH_2CH_3$. Or R1 may be H and R2 may be H. In some embodiments, for a compound of formula (1), n is lower than or equal to 110, or may be lower than or equal to 50, or may be lower than or equal to 20. In some embodiments, n=2, or 3, or 4, or 5, or 6, or 7, or 8, or 9 or 10.

In view of the numerical range of n, a compound of formula (1) is often a compound having a low molecular weight that is lower than or equal to about 10,000 g/mol, or is lower than or equal to about 5,000 g/mol, or is lower than or equal to about 2,000 g/mol, or is lower than or equal to about 1,000 g/mol, or is lower than or equal to about 400 g/mol.

When the formulation for the described coating composition comprises a mixture of compounds of formula (1), the number average molecular weight of said mixture is generally of the same low molecular weight, such that the total molecular weight of the mixture will have a low molecular weight that is lower than or equal to about 10,000 g/mol, or is lower than or equal to about 5000 g/mol, or is lower than or equal to about 2000 g/mol, or is lower than or equal to about 1000 g/mol, or is lower than or equal to about 400 g/mol. It has been found that when a molecular weight of the compound of formula (1) is too high, i.e., above 10,000 g/mol, there may be a decrease in abrasion resistance of the coating composition when cured, and hence the coating film formed therefrom.

In one or more embodiments, R1 and R2 independently represent a $C_1$-$C_{20}$ alkyl group, or a $C_1$-$C_{10}$ alkyl group, or a $C_1$-$C_5$ alkyl group. In some embodiment, R1 (and/or R2) groups are methyl, ethyl, n-propyl and n-butyl. In some embodiments, R1 and R2 represent the same group. Depending on n, R1 and R2 of formula (1), the compound may be a liquid or a solid.

A compound of formula (1) generally includes a form of a polyethylene glyol ether or a form of a polyakyleneoxide.

In one or more embodiments, the compound of formula (1) is but is not limited to poly ($\alpha,\omega$)-dialkyl oligomers or polymers of ethyleneglycol or a di-alkyl terminated oligomer or polymers of ethyleneglycol (e.g., dialkyl ethers). For example, a compound of formula (1) may be a poly (ethyleneglycol) dialkyl ether (R3=H) or a poly(ethyleneglycol) dimethyl ether or a poly(ethyleneglycol) diethyl ether. Polyethyleneglycol dialkyl ethers have molecular weights around 400 or 2,000.

Some examples of a compound of formula (1) in which R1=R2=methyl or ethyl and R3=H include, diethylene glycol diethyl ether (DEGDEE; n=2; M=162 g/mol), diethylene glycol dimethyl ether (DEGDME; n=2; M=134 g/mol), triethylene glycol dimethyl ether (TEGDME; n=3; M=178 g/mol); tetraethylene glycol dimethylether (TetraEGDME; n=4; M=222 g/mol); pentaethylene glycol dimethyl ether (PentaDEGMA; n=5; M=266 g/mol). Additional examples of a compound of formula (1) include but are not limited to diethylene glycol (DEG).

The compound of formula (1) may comprise monoalkyl ethers. Examples of a compound of formula (1) in which R1=H and R2=methyl or ethyl and R3=H) are diethylene glycol monomethyl ether (DEGMME; n=2; M=120 g/mol) and diethylene glycol monoethyl ether (DEGMEE; n=2; M=134 g/mol). Further examples include but are not limited to polyethylene glycol (PEG), ethylene glycol monomethyl ether, ethylene glycol monoethyl ether, ethylene glycol monopropyl ether.

Such compounds can be readily synthesized according to known methods or are commercially available from known chemical companies (e.g., Fluka® or Sigma-Aldrich®) as either a pure compound or as a mixture of compounds of defined average molecular weight. By way of example, poly(ethylene glycol) dimethyl ethers are commercially available as mixtures of compounds of formula $CH_3O(CH_2CH_2O)_nCH_3$ having an average molecular weight of, e.g., 150 g/mol, or of 250 g/mol, or of 400 g/mol, or of 500 g/mol, or of 1,000 g/mol, or 2,000 g/mol, etc.

The compound of formula (1) (or mixture thereof) is introduced in said formulation at a concentration that is generally from about 0.5% to about 20% by weight, relative to the weight of the coating composition. In some embodiments, the amount of the compound (or mixture thereof) of formula (1) is from about 0.5% to about 15% by weight relative to the solution weight of the coating composition. In some embodiments, the amount of the compound (or mixture thereof) of formula (1) is from about 1% to about 12% by weight relative to the weight of the coating composition. In some embodiments, the amount of the compound (or mixture thereof) of formula (1) is from about 1% to about 10% by weight relative to the weight of the coating composition. In some embodiments, the amount of the compound (or mixture thereof) of formula (1) is from about 1% to about 5% by weight relative to the weight of the coating composition.

The coating compositions described herein may, in some embodiments, include less than 5% by weight of a polyol, defined as compounds having at least two hydroxyl groups per molecule, such as a diol, or a triol. In some embodiments, the coating compositions described herein includes less than 2% by weight of a polyol. In some embodiments, the coating compositions described herein includes less than 1% by weight of a polyol. In other embodiments, the coating compositions described herein includes no polyol or diol or triol.

Further additive components of a coating composition described herein, in addition to the additive of formula (1), include one or more of a catalyst, a filler, and a wetting agent, as examples.

A suitable catalyst includes a free radical catalyst. A representative example is a metal acetylacetonate. The metal may include nickel, platinum, chromium, vanadium, magnesium, iron, cobalt, sodium, potassium and the like. In some embodiments, the metal is aluminium. In some embodiments, the catalyst is aluminium acetylacetonate.

A suitable filler includes those comprising a metal oxide and/or a metalloid oxide and/or a mineral oxide. In one or more embodiments, the filler comprises fine particles, or comprises nanoparticles, or comprises nanocrystals or comprises composite particles, e.g., those having a core/shell structure. Said fillers are generally ones that increase hardness and/or affect refractive index of the coating composition when cured. The filler may be inorganic or organic. In many embodiments, inorganic fillers are preferred. In one or more embodiments, the filler is a metal oxide, a metalloid oxide, a nitride, or a fluoride provides as fine particles, nanoparticles or nanocrystals.

Representative fillers may be selected from one or more of silicon oxide, zirconium oxide, titanium oxide, aluminium oxide, tin oxide, tantalum oxide, zinc oxide, indium oxide, cerium oxide, antimony oxide, $Si_3N_4$, and $MgF_2$ as examples. The filler may also include a mixture of said fillers as desired. In some embodiments, the filler includes a blending of mixed oxides and/or composite particles. Using different types of nanoparticles offers an opportunity to make hetero-structured nanoparticles layers.

In some embodiments, the filler includes silicon dioxide nanoparticles or silica containing nanoparticles. The filler may be provided as a nanoparticle sol. The filler may be provided in a colloidal form, as finely dispersed particles in a dispersing medium, such as water, alcohol, ketone, ester, or a mixture thereof. The filler is often of a size and refractive index that is well suited for the preparation of a transparent coating, thereby having little, negligible, or no haze. In many embodiments in which the coating composition described herein is provided for an optical article or an optical application, the filler can have a high refractive index, such that the resulting transmittance is about 50% or greater, or about 60% or greater, or up to 70%, or greater than 70%. In some embodiments, the filler may not be electrically conductive, or may be only semi-conductive.

When present, the one or more fillers are generally provided with an amount of solids (dry extract weight)/total weight of the composition that ranges from about 30% to about 60%, or from about 30% to about 65%, or from about 35% to about 55%. The filler may include a first filler alone. The filler may include more than one filler. In some embodiments, the antistatic coating composition does not comprise any nanoparticle filler in its formulation.

Filler particles often, on average, have a cross-sectional diameter lower than about 500 nanometers (nm). In some embodiments, the filler particles are less than about 200 nanometers. In some embodiments, the filler particles are less than about 100 nanometers. In some embodiments, the filler particles are less than about 50 nanometers. In some embodiments, the filler particles have a diameter that ranges from about 1 nanometer to about 100 nanometers, or ranging from about 2 nanometers to about 50 nanometers, or ranging from about 5 nanometers to about 50 nanometers, or ranging from about 2 nanometers to about 20 nanometers. In some embodiments, the filler may be provided as a particle dispersion, such as in a hydro-alcoholic solvent. Said solvent will generally be compatible with the binder solvent system. As an example, silica containing nanoparticles or colloidal silica may be provided as a dispersion in an alcohol, such as methanol. A representative silica nanoparticles dispersion is about a 30 wt. % solids dispersion (e.g., in methanol) also referred to as a silica sol, such as one obtained and described in U.S. Pat. No. 6,624,237, which is hereby incorporated by reference in its entirety. Another representative silica nanoparticle sol is Suncolloid® (registered to Nissan Chemical Industries, Ltd, Japan), which is about a 30 wt. % solids dispersion in methanol.

A suitable wetting agent used in the formulation is any wetting agent that is suitable for the article on which the coating composition is to be applied. For example, when the coating composition described herein is to be used as an antistatic coating for an optical substrate, the wetting agent will be a wetting agent that is suitable for use with an optical substrate, as would be known by one if skill in the art. Examples of wetting agents include silicone containing agents, polysiloxanes, or polydimethylsiloxane containing agents (e.g., FC-4330), or fluorocarbon containing modified polysiloxanes (EFKA® 3034; registered to Efka Chemicals, B.V. Corporation, The Netherlands), or non-ionic organic surfactants (e.g., TEGO® Wet 500 series; registered to Evonik Degussa GmBH, Germany).

Additional additives conventionally used in curable or polymerizable compositions may also be included in said composition, such as but not limited to stabilizers (e.g., such as antioxidants, UV light absorbers, light stabilizers), anti-yellowing agents, adhesion promoters, dyes, photochromic agents, pigments, rheology modifiers, lubricants, photo-initiators, fragrances, deodorants and pH regulators. These conventional additives will be included in an amount that neither decreases the effectiveness of the other components described above nor deteriorate the antistatic properties of the coating composition when cured.

When a binder is dispersed in a solvent (e.g., water or hydro-alcoholic solvent, as described previously), the solvent will be a suitable solvent useful to adjust viscosity of said composition formulation and provide proper dispersion of the less soluble components, including said additional additives.

The coating composition when formulated will generally have a theoretical dry extract weight (solids amount) that represents less than 50% of the total weight of the composition. The theoretical dry extract weight may be in a range from about 1% to about 50%, or may be in a range from about 5% to about 45%, or may be in a range from about 10% to less than about 50%. Said theoretical dry extract weight includes the weight of all of said solids. A "theoretical dry extract weight" of any one component is a theoretical weight of solid matter of that component in the composition. The theoretical dry extract weight of a composition is defined as the sum of the theoretical dry extract weights of each of its components or their calculated weight based on their formula.

The coating composition when formed provides an improved antistatic performance to avoid dust accumulation on a surface of the article on which it is formed. Antistatic performance is provided in part by the salt system in combination with the additive of formula (1). In one or more embodiments, the salt, when dispersed in the water, or the aqueous solution, or the hydro-alcoholic solvent, will partially or totally dissociate into two charged species; the stronger the acid used to provide the anion moiety of the salt, the more complete the dissociation of the salt is. The coating composition described herein, however, does not require a further acid.

It has been surprisingly found that the described coating formulation, when applied to an article, offers improved antistatic performance, and it has been found that with the additive of formula (1) in said composition, there is both an increase in the abrasion resistance and in the antistatic performance of the composition when in final form, upon curing. Said antistatic and abrasion resistance performance is found when said coating is applied on an article made of any of a number of plastic materials, including a carbonate plastic (e.g., allyl diglycol carbone or CR-39®, which is registered to PPG Industries Ohio, Inc., Delaware, USA), polycarbonate plastic, or polymethyl methacrylate plastic, as examples.

The coating composition provides good antistatic performance as well as good abrasion resistance also in part from the binder, such as when the binder is an epoxysilane. Thus, in use, the coating composition, when cured from a formulation as described herein, which includes at least the following: at least one additive of formula (1), the described salt system, and the silane containing binder of formula (2), exhibits good abrasion resistance properties and good antistatic performance, which have been found to be better than other coating compositions that do not contain the formulation described herein, which has at least the additive of formula (1), the silane containing binder of formula (2), and said salt system.

The coatings compositions described herein, when cured, may be transparent, and may be provided as antistatic hard coats. The coating may be provided to any article or substrate requiring such a coating. One example, though only representative, is an optical article, such as an ophthalmic lens.

In one or more embodiments, an article described herein includes an article having one or more exposed surfaces and said coating composition adjacent said one or more exposed surfaces, thereby providing a coating to at least some or all of said one or more exposed surfaces. The exposed surface of the article therefore includes the described coating composition (i.e., a composition prepared from at least one of the additive of formula (1), the described salt system, and the silane containing binder of formula (2)). In some embodiments, the article is at least partially coated with the coating composition. The coating when cured may form a transparent antistatic layer. In some embodiments, the article is considered to be coated with the composition that forms the transparent antistatic layer. The article is formed by depositing onto the one or more exposed surfaces of the article the composition described herein, and curing the composition, thereby forming a coated or at least partially coated article.

In one or more embodiments, the composition is a coating or film on a transparent article or article having a transparent substrate. The transparent article or substrate may include an optical article, such as an ophthalmic lens (plano or afocal lens, corrective lens, e.g., unifocal, bifocal, trifocal or progressive lens), ocular visor, or may serve in an optical system. The transparent substrate may be a lens or lens blank. The transparent article or substrate may be coated on any or all of its exposed surfaces, such as a front side, or a back side, or edge(s), or both front and back sides, or all of the front and back sides and edges. The substrate may be mineral or organic. Representative organic substrates that may be useful as optical articles include those prepared from one or more thermoplastic material, such as polycarbonates, polymethylmethacrylates, polyurethanes, or polyamides. Additionally, substrates, including optical substrates, may be prepared from one or more thermosetting material such as polymers or copolymers of diethylene glycol bis(allylcarbonate), polyurethanes, polythiourethanes, polyepoxides, polyepisulfides, poly(meth)acrylates, bisphenol-A (meth) acrylic derivatives, polythio(meth)acrylates, or blends thereof. In some embodiments, the substrate is a lens substrates prepared from a polycarbonate material. In some embodiments, the substrate is a lens substrate prepared from a diethylene glycol bis(allylcarbonate) polymer. In some embodiments, the substrate is photographic film. In some embodiments, the substrate is not transparent. In some embodiments, the substrate is an electronic package or electrical device or chip. In some embodiments, the substrate is a material used for imaging.

The process of depositing the composition described herein, particularly when forming a thin film, will take advantage of known techniques for forming a coating or a thin film. Representative processes include spin coating, dip coating, spray coating, strand coating, brush coating, and roller coating. In some embodiments, the composition is deposited by spin coating on at least one exposed surface of a substrate. In some embodiments, the composition is deposited by dip coating on at least one exposed surface of a substrate. In some embodiments, the surface may be pretreated prior to addition of the composition described herein. Pretreatment may include a chemical of physical treatment to the surface. Pretreatment may include applying an initial coating layer to the surface (e.g., primer). In some embodiments, the surface may be include more than one method or means of pretreatment (chemically or physically manipulating the surface). Upon depositing the composition described herein, all or a portion of the substrate will be coated. Following depositing, the composition is cured. Curing depends in part on the binder and additives that are included in the composition formulation. For example, with a UV curable binder and/or additive, the composition is cured by UV light exposure. With a heat sensitive or curable binder and/or additive, the composition is cured by activation in the presence of heat, generally at the requisite temperature for curing said composition. Curing may include a combination of one or more means for curing, such as a change in temperature, exposure to heat, exposure to some type of light, exposure to actinic radiation, and various combinations thereof. In some embodiments, the composition may cure without requiring an additional means for curing. Upon curing, the composition provides a coating to said substrate (or at least to the exposure surface to which the coating was applied), such that the coating functions as an antistatic surface due to the improved antistatic properties provided by the composition when fully cured. In one or more embodiments, the coating, upon curing will provide good abrasion resistance to the substrate (or at least to the surface to which the coating was applied) and the coating, when applied, will function as an abrasion resistance surface for the substrate (or at least to the surface to which the coating was applied).

The process for preparing a transparent article or substrate with antistatic properties will comprise providing a transparent article or substrate having at least one exposed surface, applying a composition described herein onto at least a portion of the at least one exposed surface, such that the composition is transparent, and curing said composition to form a hardened coating on said transparent article or substrate.

The coating composition described herein is typically applied to an article or a surface such that a final thickness of the coating composition when fully cured or hardened is at or less than 5000 nanometers. In some embodiments, the final thickness is from about 5 nanometers to about 5000 nanometers. In some embodiments, the final thickness is from about 1000 nanometers to about 5000 nanometers. In some embodiments, the final thickness is from about 1 nanometer to about 1000 nanometers. In some embodiments, the final thickness is from about 1000 nanometers to about 4000 nanometers. In some embodiments, the final thickness is about or less than about 4000 nanometers.

In one or more embodiments, the composition when cured or hardened will be light transmissive. In some embodiments, the composition when cured or hardened will not block light transmittance of a transparent article on which it is applied or deposited onto. In one or more embodiments, the article when coating by the composition described herein remains highly transmissive to light, having a light transmittance of at least or greater than 90%, or at least or greater than 92%, or at least or greater than 94%, or at least or greater than 95%. In one or more embodiments, the composition will not provide significant haze, thereby considered to have low haze. In some embodiments, the low haze is at least or less than 0.3%, or is at least or less than 0.25%, or is at least or less than 0.24%, is at least or less than 0.23%, is at least or less than 0.22%, is at least or less than 0.21%, is at least or less than 0.20%, is at least or less than 0.19%.

In one or more embodiments, the composition is electrically conducting.

When a composition described herein is deposited or applied to a transparent article, such as an optical article, the decay time of the transparent article is about or less than about 500 milliseconds, or is about or less than about 350 milliseconds, or is about or less than about 300 milliseconds, or is about or less than about 250 milliseconds, or is about less than about 225 milliseconds, or is about less than about 200 milliseconds.

The coating composition described herein, one that comprises at least the following: at least one of the additive of formula (1), the described salt system, and the silane containing binder of formula (2), has been found to perform well as an antistatic coating or film when applied to a number of different substrates, such that the type of substrate does not appear to greatly affect the antistatic behavior of said coating composition. This is contrasted with alternative coating compositions. The coating composition described herein is contrasted with alternative compositions that may include a salt and a binder with a different compound of formula (1) and also require the presence of an acid, such as a Brønsted acid.

Representative examples of coating compositions are now described that include two different additives as a compound of formula (1). The first compound of formula (1) is represented by DEGDME (D1). The second compound of formula (1) is represented by DEGMME (D2). Compositions were prepared using varying percentages of each of the additives. In some embodiments, both sides of an article or substrate were coated with the described coating composition. The article or substrate was, in all the examples, an ophthalmic quality lens made of either a polycarbonate (PC) material, or an allyl diglycol carbone material (e.g., CR-39®), or a material for making a 1.67 lens. Charge decay time, abrasion resistance, haze and transmission, and adhesion were measured as described below.

The charge decay time of the surface of a coating composition was measured using a charge decay analyser that deposited a high voltage corona discharge (e.g., at 9000 volts) as a patch of charge onto the surface of the coating composition to be tested. The analyser was a fast response electrostatic field meter that measured the voltage generated by the patch of charge and assessed its decay characteristics. In the examples, a JCI 155v5 Charge Decay Time Analyzer was used at ambient temperature (approximately 25.4° C.) and a relative humidity of about 50%. The analyser included a JCI 176 Charge Measuring Sample Support, a JCI 191 Controlled Humidity Test Chamber, and a JCI 192 Dry Air Supply Unit.

Abrasion resistance was measured in accordance with sand Bayer Test, determining abrasion resistance of a curved lens surface. The test used was generally in accordance with the ASTM F735-81, Standard Test Method for Abrasion Resistance of Transparent Plastics and Coatings Using the Oscillating Sand Method. In brief, a coated surface of the article (i.e., lens) was subjected to abrasion in an oscillating abrasive box using sand (approximately 1000 g) for 1 cycle of 300 forward and back motions. An amount or degree of abrasion was measured and performance results, as a Bayer value, were expressed as a calculated ratio of a reference lens to the coated lens, in which the degree of abrasion is a change in haze as measured by a hazemeter [Bayer value=Haze (reference)/Haze (sample)]. A higher Bayer value indicates a higher abrasion resistance. The reference lens was a 6 base plano uncoated Orma® lens (registered to Essilor International (Compagnie Generale d'Optique), France]. A Bayer value of about 2 or about 3 is acceptable for an optical surface. A Bayer value of 3 or higher is also acceptable.

The haze value of the coated substrate was measured by light transmission that illuminated each coated substrate by a substantially unidirectional beam using a haze meter (Haze Guard Plus from BYK-Gardner). The haze meter was initially calibrated according to the manufacturer's directions. Test and measurements made were in accordance with ASTM D1003-00, which is incorporated herein by reference in its entirety. In brief, each sample was placed on a path of a transmission light beam in the pre-calibrated haze meter and a haze value was recorded from three different specimen locations; the three haze values were then averaged. Any reference to a haze value is upon application of the standards under ASTM D1003-00. Light transmittance was measured using the same device. All measurements were performed at ambient temperature (approximately 25° C.) and a relative humidity of about 50%. When said composition is provided with an optical article, low haze characteristics are preferred. As haze is a measurement of the transmitted light scattered more than 2.5° from the axis of the incident light, the smaller the haze value, the lower the degree of cloudiness. Generally, for optical articles described herein, a haze value of at or less than about 0.8% is acceptable. In addition, a haze value of at or less than about 0.45% is acceptable.

An adhesion test, referred to as a crosshatch adhesion test, was performed on coated articles in accordance with ISTM 02-010 For each article, a grid of about 25 1 mm squares was prepared on the surface using a tool that has six (6) parallel razor blades 1 mm apart. The grid was cut into the coating at least 5 to 10 mm from the edge of the article. Then, using 3M 250 tape having nominal adhesion on steel (e.g., about 710 cN/cm, in accordance with D-3330) that has not been exposed to air, a small piece was removed from the roll and applied uniformly to the grid using a plastic spatula, after which there was approximately 15 to 20 mm of tape extending from the edge of the article. The tape was subsequently and quickly removed from the lens with a sharp, rapid and continuous movement. This was repeated 5 times on the same grid. A score of 0 means there was no coating loss after removal of the tape. A score of 1 meant that that there was a less than one half of one square of coating loss. Any loss of coating greater than one half of one square was considered a failure. According to ISTM 02-010, a total score is calculated, which could be from 0 to 5. A total score of 0 or 1 is considered acceptable (pass), whereas a score of 2 to 5 is not acceptable (failure).

A hand steel wood test was used to evaluate scratch resistance. This test consists of abrading a lens with steel wool via 5 back and forth strokes (each having an amplitude of about 4 to 5 cm while keeping constant pressure on the steel wool with an index finger). Strength pressed on the steel wool can be evaluated with a balance by fixing the article on the balance plate with adhesive tape and pressing down on the article with the index finger, exercising normal strength on the article; this strength is about 5 kg in a first direction and about 2.5 kg in the return direction. After abrasion is completed, the article is visually inspected and scored as follows: low resistance 5; acceptable resistance 3; or good resistance 1. The higher the score the means the article is more abraded.

To prepare coating compositions, a base composition may be used. Said base composition may be soluble or dispersible in a selected solvent system. Representative components for a coating composition described herein generally include the amounts depicted in TABLE 1. To said components, which may a base composition, a salt system as described herein and an additive compound of formula (1) may be included in the amounts described herein. Additional additives, such a pH balancer may also be introduced, either to the base composition, or with addition of the other components when included to provide any of the coating compositions described herein.

TABLE 1

| | wt. % range |
|---|---|
| binder of formula(2) | 40-70 |
| filler dispersion | 40-60 |
| catalyst | ≤2 |
| wetting agent | <1 |

One example of a base composition is identified in TABLE 2. The base composition of TABLE 2 included a binder of formula (2) as an alkoxysilane in the form of γ-glycidoxypropyltrimethoxysilane, a second binder of formula (2) was in the form of dimethyldiethoxysilane, in addition to a solvent in the form of methylethylketone, a pH balancer in the form of 0.1 N hydrochloric acid, a high transmittance filler in the form of a silica oxide colloidal dispersion with nanoparticles less than 20 nm in diameter (30% in methanol), a catalyst in the form of aluminum acetyl acetonate, and a wetting agent, such as a fluorocarbon containing organically modified polysiloxane (i.e., EFKA®-3034).

TABLE 2

|  | g (in solution) | solids (g) |
|---|---|---|
| binder 1 | 18.6 | 13 |
| binder 2 | 9.7 | 7.8 |
| pH balancer | 6.6 | — |
| filler | 60.1 | 18 |
| solvent | 3.7 | — |
| catalyst | 1.2 | 0.24 |
| wetting agent | 0.1 | 0.02 |

To the above composition containing the binder of formula (2), a compound of formula (1) was included. Two representative compounds of formula (1) were added in the following examples, either as DEGDME (D1) or DEGMME (D2), each in an amount that ranged from 1 wt. % to 5 wt. %, as depicted in TABLE 3 and TABLE 4, respectively. Thus, D1-1 included 1 wt. % of D1 and D1-2 included 2 wt. % of D1, etc., and repeated for D2. The salt system provided in each formulation was lithium bis(trifluoro-methanesulfonimide). An additional solvent was included in some of these compositions in the form of a polyoxyalkylene, as a glycol ether having a boiling point less than 150° C. (i.e., Dowanol® PM). This was to ensure that representative formulations had the same solids content.

TABLE 3

|  | g (in solution) | | | | |
|---|---|---|---|---|---|
|  | D1-1 | D1-2 | D1-3 | D1-4 | D1-5 |
| base | 93 | 93 | 93 | 93 | 93 |
| D1 | 1 | 2 | 3 | 4 | 5 |
| salt | 2 | 2 | 2 | 2 | 2 |
| added solvent | 4 | 3 | 2 | 1 | 0 |

TABLE 4

|  | g (in solution) | | | | |
|---|---|---|---|---|---|
|  | D2-1 | D2-2 | D2-3 | D2-4 | D2-5 |
| base | 93 | 93 | 93 | 93 | 93 |
| D2 | 1 | 2 | 3 | 4 | 5 |
| salt | 2 | 2 | 2 | 2 | 2 |
| added solvent | 4 | 3 | 2 | 1 | 0 |

For comparison, the base formulation of TABLE 2 was also modified as shown in TABLE 5. In each of these comparative formulations, the composition lacked any additive of a compound of formula (1). In one of these formulations, the comparative formulation also lacked the salt system (Ref-1). Only one of these formulations included the added solvent in addition to the salt (Ref-3) for maintaining the solids content. The additional solvent in Ref-3 was to ensure that the reference compositions had the same solids content.

TABLE 5

|  | g (in solution) | | |
|---|---|---|---|
|  | Ref-1 | Ref-2 | Ref-3 |
| base | 100 | 98 | 93 |
| D1 or D2 | 0 | 0 | 0 |
| salt | 0 | 2 | 2 |
| added solvent | 0 | 0 | 5 |

Each of the compositions, D1-1 to D1-5 and D2-1 to D2-5, as well as Ref-1, Ref-2, Ref-3, were well all blended before depositing as a coating composition on a lens article.

For D1, coating compositions having any of 1 wt. %, 2 wt. %, 3 wt. %, 4 wt. %, or 5 wt. % of D1 as depicted in TABLE 3 were compared to the formulations lacking either D1 or D2, which were Ref-1, Ref-2, and Ref-3 as depicted in TABLE 5. For evaluation, each of D1-1, D1-2, D1-3, D1-4, D1-5, Ref-1, Ref-2, and Ref-3 was prepared and applied to an ophthalmic quality PC lens. Initially, the PC lens was plasma treated for about 120 seconds in the manner known in the art. To the convex side of the PC lens, a primer was applied by spin coating in the manner known in the art, which was following by heating to a temperature of about 75° Centigrade (C) for about 15 minutes. The primer was a polyurethane dispersion in an aqueous solution (containing about 40 wt. % Witcobond 234 or Witcobond 240), known to one of ordinary skill in the art. The primer layer had a final thickness of about 0.8 to 0.9 micrometers. The primed lens was allowed to cool to ambient or room temperature after which one of the coating compositions (D1-1, D1-2, D1-3, D1-4, D1-5) was applied to the coated convex side of a PC lens by spin coating. This was repeated for all coating compositions, and then with Ref-1, Ref-2, and Ref-3. Upon application, each of said compositions (D1-1, D1-2, D1-3, D1-4, D1-5) was cured in a two step process that included a pre-curing at a temperature of about 75° C. for about 15 minutes and a post-curing at a temperature of about 100° C. for about 3 hours, which allowed each composition to form on the surface of the lens article as a hard coat. This was repeated for Ref-1, Ref-2, or Ref-3. The coatings forming the antistatic hard coat layer had a final thickness of about 3.5 to 3.8 micrometers. Similarly, the final thickness for Ref-1, Ref-2, or Ref-3 was about 3.5 to 3.8 micrometers. When hardened, decay time as depicted in TABLE 6 was measured for each article (lens having a coating composition on one surface) and data was compared to the lens having either Ref-1, Ref-2, or Ref-3 of TABLE 5. All of the coating compositions, D1-1, D1-2, D1-3, D1-4, and D1-5, exhibited a reduced decay time as compared with the comparative formulations Ref-1, Ref-2, Ref-3, lacking the salt and/or compound of formula (1). Further, all of the compositions, D1-1, D1-2, D1-3, D1-4, and D1-5, exhibited good overall coating performance (crosshatch: all 0; steel wool: all 3s). Additionally, compositions, D1-1, D1-2, D1-3, D1-4, and D1-5, showed only a low haze (<0.5% or <0.16%) with a good abrasion resistance as measured by sand Bayer (>2.5 or >2.7). Some of the performance data are shown below in TABLE 6.

TABLE 6

|  | Haze (%) | Sand Bayer | Decay time (ms) |
|---|---|---|---|
| Ref-1 | 0.42 | 3.1 | 37600 |
| Ref-2 | 0.40 | 2.9 | 430 |
| Ref-3 | 0.43 | 2.9 | 406 |

TABLE 6-continued

|  | Haze (%) | Sand Bayer | Decay time (ms) |
| --- | --- | --- | --- |
| D1-1 | 0.14 | 2.9 | 391 |
| D1-2 | 0.15 | 2.9 | 380 |
| D1-3 | 0.16 | 2.8 | 301 |
| D1-4 | 0.14 | 2.8 | 378 |
| D1-5 | 0.13 | 2.7 | 287 |

For D2, coating compositions having any of 1 wt. %, 2 wt. %, 3 wt. %, 4 wt. %, or 5 wt. % of D2 as depicted in TABLE 4 were compared to the formulations lacking either D1 or D2, which were Ref-1, Ref-2, and Ref-3 as depicted in TABLE 5. For evaluation, each of D2-1, D2-2, D2-3, D2-4, D2-5, Ref-1, Ref-2, or Ref-3 was prepared and applied to an ophthalmic quality PC lens. Initially, the PC lens was plasma treated for about 120 seconds in the manner known in the art. To the convex side of the PC lens, a primer was applied by spin coating in the manner known in the art, which was following by heating to a temperature of about 75° C. for about 15 minutes. The primer was the same polyurethane primer described above. The primer layer had a final thickness of about 0.8 to 0.9 micrometers. The primed lens was allowed to cool to ambient or room temperature after which one of the coating compositions (D2-1, D2-2, D2-3, D2-4, D2-5) was applied to the coated convex side of the PC lens by spin coating. This was repeated for Ref-1, Ref-2, or Ref-3. Upon application, each of said compositions (D2-1, D2-2, D2-3, D2-4, D2-5) was cured in a two step process that included a pre-curing at a temperature of about 75° C. for about 15 minutes and a post-curing at a temperature of about 100° C. for about 3 hours, which allowed each coating composition to form on the surface of the lens article as a hard coat. This was repeated for Ref-1, Ref-2, or Ref-3. The compositions forming the antistatic hard coat layer had a final thickness of about 3.5 to 3.8 micrometers. Similarly, the final thickness for Ref-1, Ref-2, or Ref-3 was about 3.5 to 3.8 micrometers. When hardened, decay time as depicted in TABLE 7 was measured for each article (lens having a coating composition on one surface) and data was compared to the lens having either Ref-1, Ref-2, or Ref-3 of TABLE 5. All of the compositions, D2-1, D2-2, D2-3, D2-4, and D2-5, exhibited a reduced decay time as compared with the comparative formulation, Ref-1, Ref-2, Ref-3, lacking the compound of formula (1) and/or the salt system. Further, all of the compositions, D2-1, D2-2, D2-3, D2-4, and D2-5, exhibited good overall coating performance, including good adhesion. Compositions, D2-1, D2-2, D2-3, D2-4, and D2-5, showed only a low haze (<0.5% or <0.25%) and exhibited good abrasion resistance as measured by sand Bayer (>2.9). Some of the performance data are shown in TABLE 7.

TABLE 7

|  | Haze (%) | sand Bayer | Decay time (ms) |
| --- | --- | --- | --- |
| Ref-1 | 0.42 | 3.1 | 37600 |
| Ref-2 | 0.40 | 2.9 | 430 |
| Ref-3 | 0.43 | 2.9 | 406 |
| D2-1 | 0.23 | 2.9 | 352 |
| D2-2 | 0.19 | 2.8 | 293 |
| D2-3 | 0.25 | 2.7 | 225 |
| D2-4 | 0.21 | 2.6 | 254 |
| D2-5 | 0.24 | 2.6 | 285 |

A representative composition that included D1 as the compound of formula (1) in an amount of 4 wt. % (D1-4) and a representative composition that included D2 as the compound of formula (1) in an amount of 3 wt. % (D2-3) were each evaluated on different substrate articles. These representative compositions were compared with Ref-3 that did not include either D1 or D2 but did include the salt.

Each of D1-4, D2-3 and Ref-1 was prepared as described above. Two types of lens articles were used: Orma® lenses, and 1.67 lenses. Each lens was initially plasma treated for about 60 seconds. Each lens was initially coated on one surface with a primer as described above, such that the primer had a final thickness of about 0.8 to 0.9 micrometers. The antistatic hard coat layer as either D1-4 or D2-3 was applied as described above, and allowed to harden as described above. For comparison, a layer of Ref-3 was applied to separate lenses, prepared in the same manner Each of D1-4 or D2-3, which when hardened formed a described antistatic hard coat layer, had a final thickness of about 3.5 to 3.8 micrometers. Similarly, Ref-3 has a final thickness of about 3.5 to 3.8 micrometers. Each lens was measured for decay time, haze and abrasion resistance or scratch resistance. As before, each of D1-4 and D2-3 showed good adhesion resistance or scratch resistance and low haze as compared with Ref-1 (data not shown). The antistatic performance of each lens article, measured as described previously, showed a far better antistatic performance for both D1-4 and D2-3 as compared with Ref-3, as depicted in TABLE 8.

TABLE 8

|  | Decay time (milliseconds) | |
| --- | --- | --- |
|  | Orma ® lens | 1.67 lens |
| Ref-3 | 158 | 301 |
| D1-4 | 125 | 177 |
| D2-3 | 119 | 164 |

Each of D1-4, D2-3 was also prepared as described above and evaluated as an antistatic hard coat when applied directly onto a substrate or lens article. The data was compared with Ref-3 that did not include either D1 or D2 but did include the salt. Here, each of D1-4, D2-3 or Ref-3 was applied to a lens article that was an Orma® lens that had been initially plasma treated for about 60 seconds. No primer was applied. Instead, the antistatic hard coat layer as either D1-4, D2-3 was applied to the convex side of the Orma® lens, as described above, and allowed to harden as described above. For comparison, a layer of Ref-3 was applied to a similarly prepared lens (e.g., pretreated and without a primer). Each of D1-4 or D2-3, forming the antistatic hard coat layer, had a final thickness of about 3.5 to 3.8 micrometers. Similarly, Ref-3 has a final thickness of about 3.5 to 3.8 micrometers. Each lens was measured for decay time, haze and abrasion resistance or scratch resistance. As before, each of D1-4 and D2-3 showed good adhesion resistance or scratch resistance and low haze as compared with Ref-1 (data not shown). Similar to previous data, the antistatic performance of D1-4 and D2-3, measured as described previously, was far better as compared with Ref-3, as depicted in TABLE 9.

TABLE 9

|  | Decay time (milliseconds) Orma ® lens |
| --- | --- |
| Ref-3 | 136 |
| D1-4 | 108 |
| D2-3 | 101 |

As shown in TABLES 6-9, compositions described herein, those comprising at least the following, including one of the described salts, one of the described binders, and one of the described compounds of formula (1), provide good antistatic performance on their surface and to an article onto which they are applied when they form a coating or hard coat or thin film on an exposed surface of said article.

Said antistatic coating compositions provide good optical transmittance, and they do not affect the optical transmittance of a transparent article on which they are applied.

Said antistatic coating composition also offer good abrasion resistance or scratch resistance on their surface and to the surface of the article on which they are applied.

Thus, the described antistatic coating compositions described herein exhibit any and generally all of the following: high antistatic performance, high light transmittance, and superior abrasion or scratch resistance.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values, including the values "a" and "b" themselves.

Terms such as "first," "second," "third," etc. may be arbitrarily assigned and are merely intended to differentiate between two or more components, parts, or steps that are otherwise similar or corresponding in nature, structure, function, or action. The use of the term "first" does not mean that there is a required "second" similar or corresponding component, part, or step. Similarly, the use of the word "second" does not mean that there must be any "first" or "third" similar or corresponding component, part, or step. Further, it is to be understood that the use of the term "first" does not mean that the element or step be the very first in any sequence, but merely that it is at least one of the elements or steps. Accordingly, the use of such terms does not exclude intervening elements or steps between the "first" and "second" elements or steps.

Although representative compositions, processes and articles have been described in detail herein, those skilled in the art will recognize that various substitutions and modifications may be made without departing from the scope of what is described and defined by the appended claims.

The invention claimed is:

1. A curable transparent antistatic coating composition comprising:
a salt, wherein the salt comprises an alkali cation or rare earth ion and a counter ion which is the conjugate base of a superacid;
a filler;
a compound depicted as formula (1):

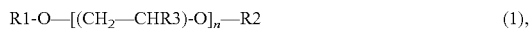

wherein R1 and R2 represent H, or an alkyl group, R3 is H or methyl, and n is an integer ranging from 2 to 200; and
a silicon-containing binder;
wherein the curable transparent antistatic coating composition does not contain a conductive polymer; and
wherein the curable transparent antistatic coating composition provides upon curing an antistatic coating exhibiting a light transmittance of at least or greater than 90%, a decay time on its surface of less than 400 milliseconds, and a haze value of about or less than about 0.50%.

2. The antistatic coating composition of claim 1, wherein the alkali cation of the salt is a lithium cation.

3. The antistatic coating composition of claim 1, wherein the binder has a formula depicted as formula (2):

or is a hydrolysate thereof, in which the R groups are identical or different and represent monovalent organic groups linked to the silicon atom through a carbon atom, the Y groups are identical or different and represent monovalent organic groups linked to the silicon atom through a carbon atom and contain at least one epoxy function, the X groups are identical or different and represent hydrolysable groups or hydrogen atoms, and m and n' are integers such that m is equal to 1 or 2 and n'+m=1 or 2.

4. The antistatic coating composition of claim 1, wherein the salt is in an amount about or less than about 5% by weight relative to the dry weight of the composition.

5. The antistatic coating composition of claim 1, wherein the binder is an epoxysilane compound dispersible or soluble in a solvent.

6. The antistatic coating composition of claim 1, wherein the binder is in an amount ranging from about 40% to about 70% by weight based on the total weight of the composition.

7. The antistatic coating composition of claim 1, wherein the filler is provided as mineral oxide nanoparticles.

8. The antistatic coating composition of claim 1, further comprising a catalyst or cross-linking agent that reacts with a functional group, including an epoxy group, on the binder.

9. The antistatic coating composition of claim 1, wherein the compound of formula (1) is a compound of an ethylene glycol.

10. The antistatic coating composition of claim 1, wherein the compound of formula (1) is in an amount ranging from about 0.5 to about 20% by weight based on the total weight of the composition.

11. An antistatic article comprising:
a transparent substrate, wherein the substrate has at least one exposed surface; and
an antistatic coating, wherein the antistatic coating is a hard coat formed on at least a portion of the exposed surface of the transparent substrate from the antistatic coating composition of claim 1, wherein the antistatic coating exhibits a decay time on its surface that is less than 400 milliseconds, a light transmittance of at least or greater than 90%, and a haze value of about or less than about 0.50%, and wherein the antistatic coating composition does not contain a conductive polymer.

12. The antistatic article of claim 11, wherein the antistatic coating has a final thickness in a range from about 5 to about 5000 nm.

13. The antistatic article of claim 11, wherein the antistatic coating is formed from a formulation comprising:
a salt, wherein the salt comprises an alkali cation or rare earth metal ion and a counter ion which is the conjugate base of a superacid;
a compound depicted as formula (1):

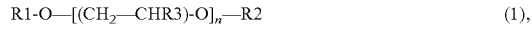

wherein R1 and R2 represent H, or an alkyl group, R3 is H or methyl, and n is an integer ranging from 2 to 200;
a binder, wherein the binder has a formula depicted as formula (2):

or is a hydrolysate thereof, in which the R groups are identical or different and represent monovalent organic groups linked to the silicon atom through a carbon atom, the Y groups are identical or different and represent monovalent organic groups linked to the silicon atom through a carbon atom and contain at least one epoxy function, the X groups are identical or different and represent hydrolysable groups or hydrogen atoms, and m and n' are integers such that m is equal to 1 or 2 and n'+m=1 or 2; and optionally a solvent.

14. The antistatic article of claim 11, further defined as an ophthalmic lens.

15. A process for preparing an antistatic article, the process comprising:

providing a transparent substrate, wherein the transparent substrate has at least one exposed surface, applying onto the at least one exposed surface of the transparent substrate an antistatic coating composition having a composition of claim 1; and curing the antistatic coating composition after applying the antistatic coating composition.

16. The antistatic coating composition of claim 1, wherein R1 represents H or R2 represents H.

17. The antistatic coating composition of claim 1, wherein the compound of formula (1) has a molecular weight lower than or equal to about 5,000 g/mol.

18. The antistatic article of claim 11, wherein the compound of formula (1) has a molecular weight lower than or equal to about 5,000 g/mol.

19. The antistatic coating composition of claim 1, wherein the curable transparent antistatic coating composition provides upon curing an antistatic coating exhibiting a haze value of less than or equal to 0.30%.

20. The antistatic coating composition of claim 1, wherein the salt is lithium bis(trifluoro-methanesulfonimide).

* * * * *